Dec. 1, 1959     E. W. BERGMANN     2,914,990
MACHINE TOOL CONSTRUCTION
Original Filed May 3, 1950     4 Sheets-Sheet 1
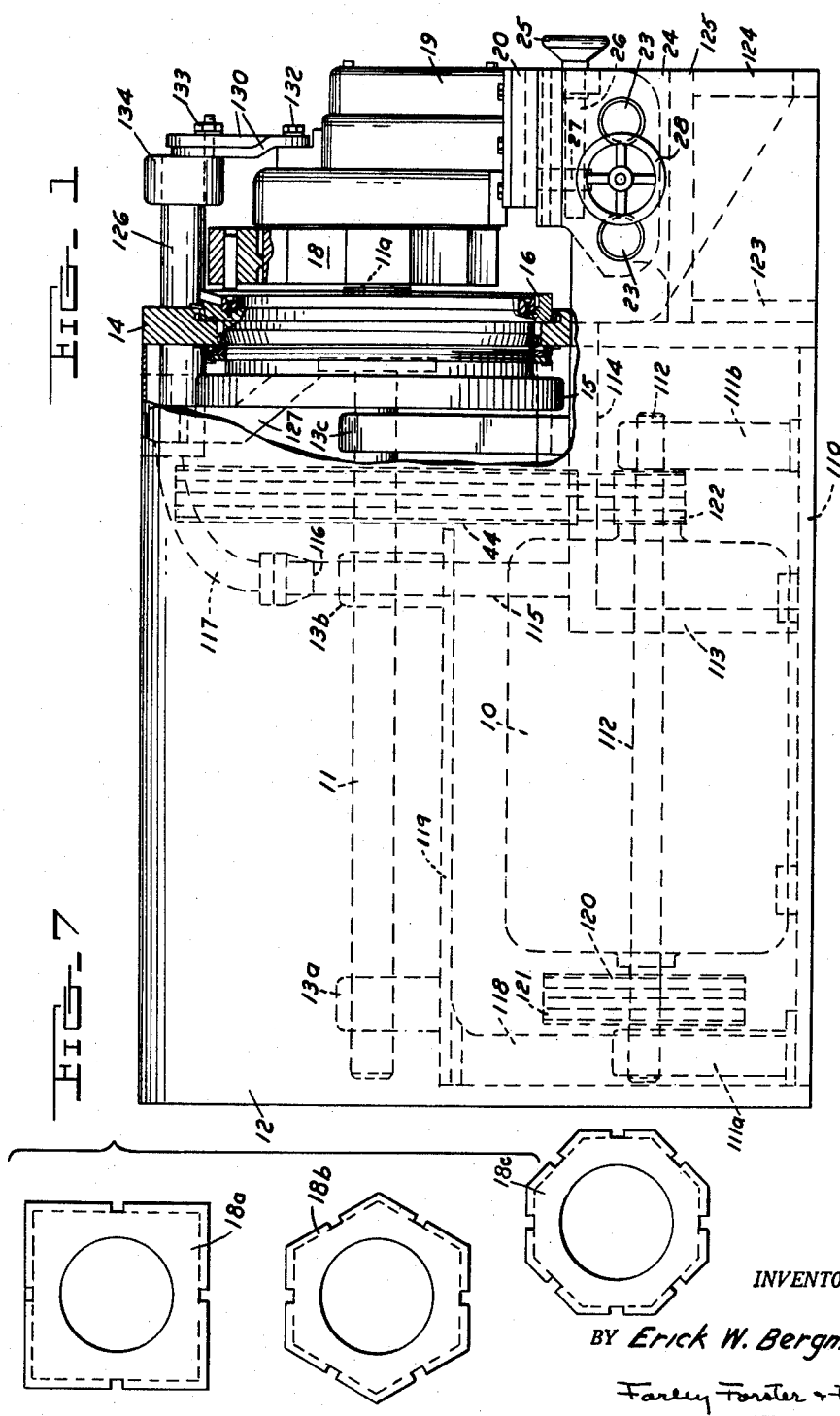
INVENTOR.
BY *Erick W. Bergmann*
*Farley Forster + Farley*
ATTORNEYS

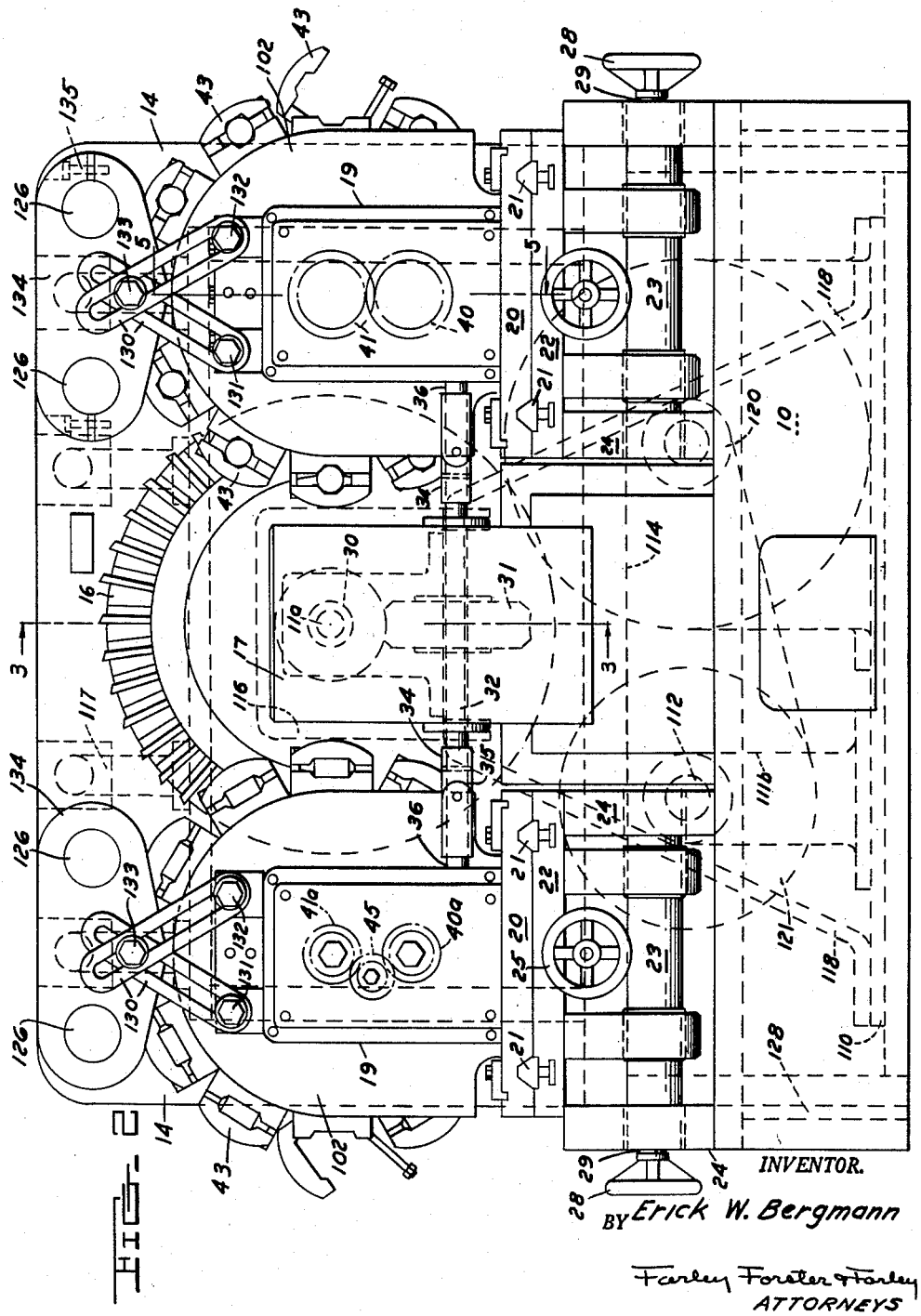

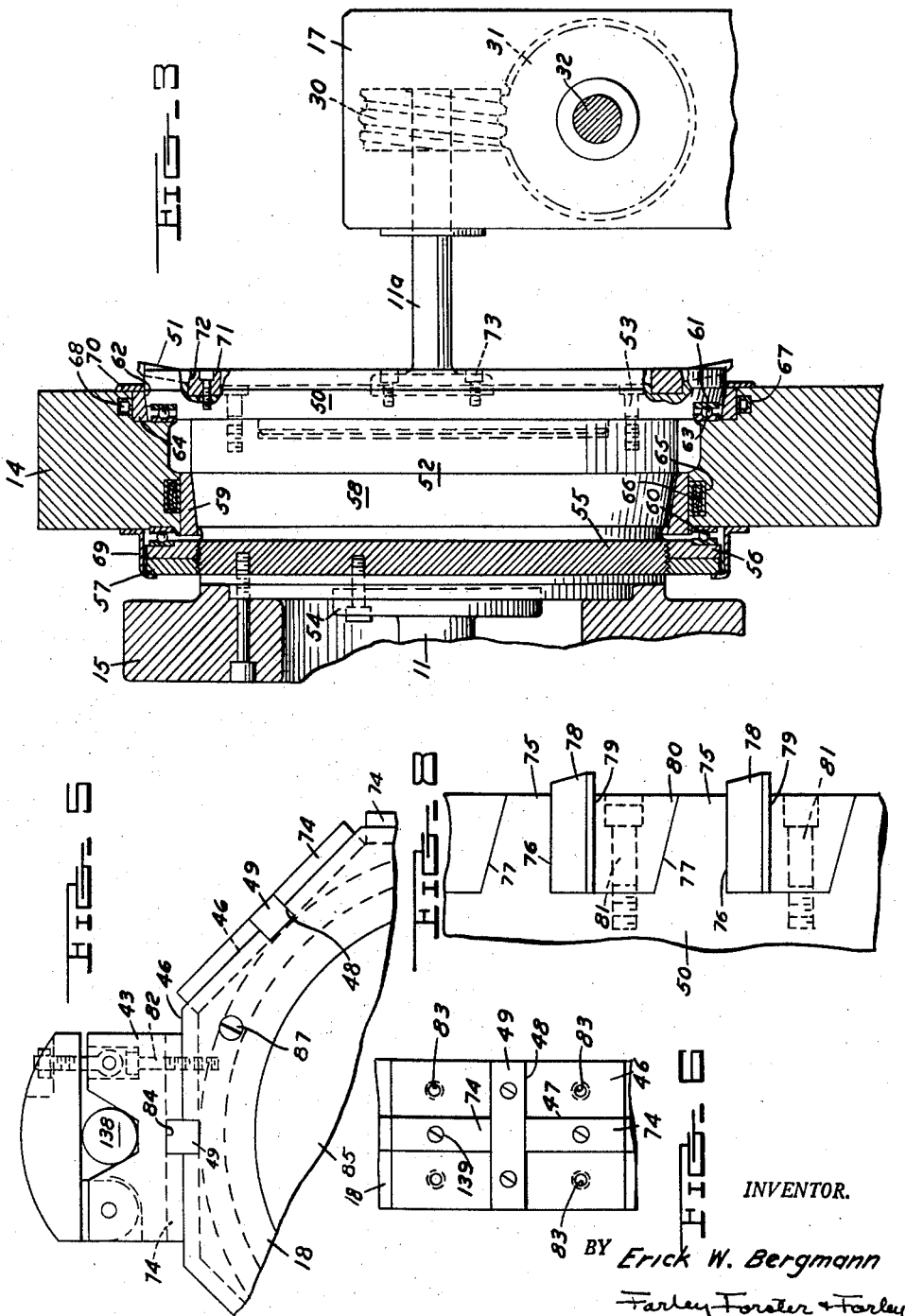

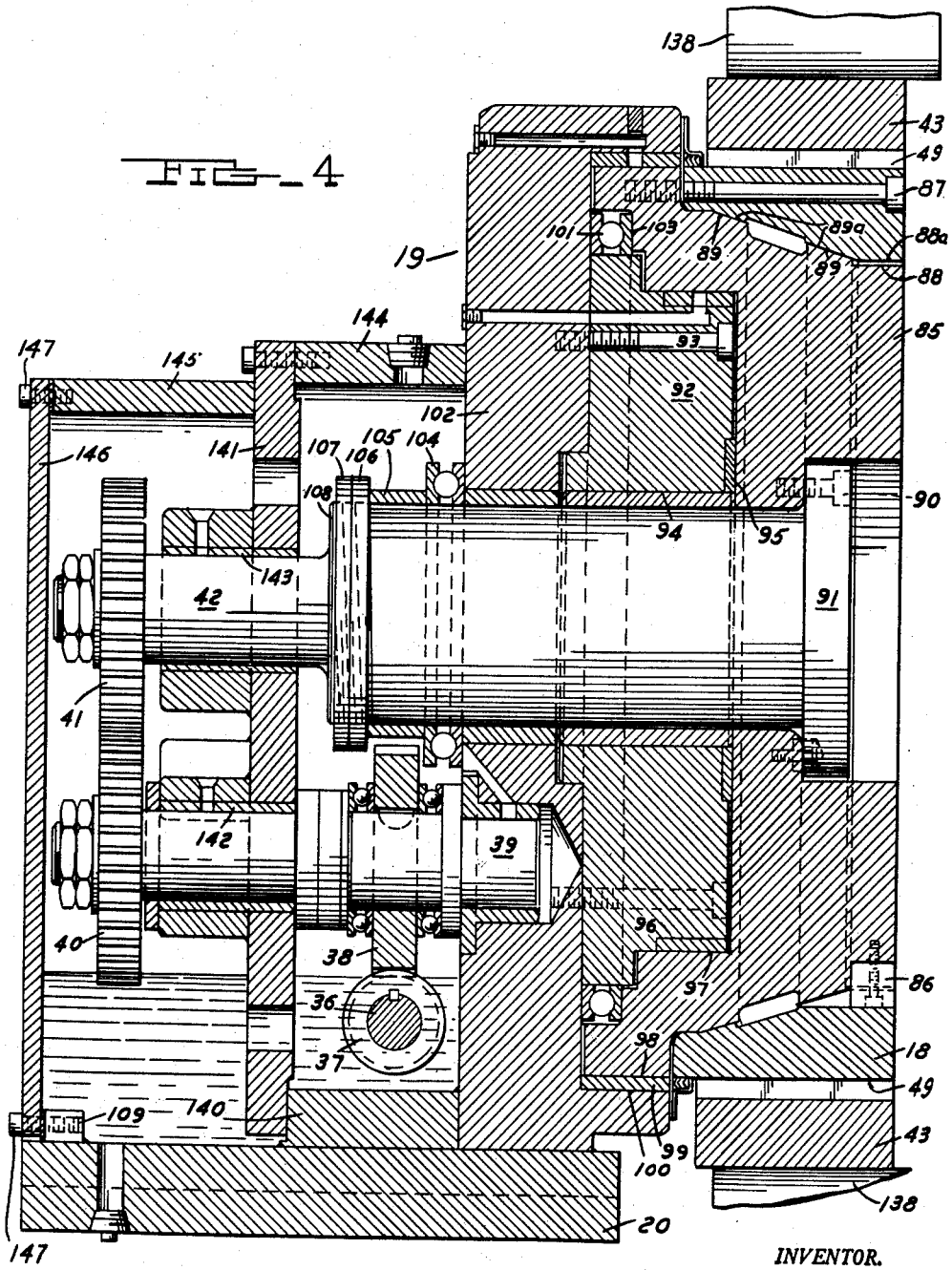

United States Patent Office 2,914,990
Patented Dec. 1, 1959

2,914,990

MACHINE TOOL CONSTRUCTION

Erick W. Bergmann, Monroe, Mich.

Original application May 3, 1950, Serial No. 159,833, now Patent No. 2,729,144, dated January 3, 1956. Divided and this application December 27, 1955, Serial No. 555,430

3 Claims. (Cl. 90—11)

This invention relates to improvements in the design and construction of machine tools of the rotary tool type, and to improvements in the construction and interrelationship of certain component parts thereof, particularly tool and work holders.

Generally, these improvements consist in providing a rotary tool holder on which tools may be mounted at relatively large working diameters to better attain high tool speeds; providing for increased operating accuracy of the tools carried by this tool holder by mounting the tool holder itself in a system of bearings located around the periphery of the tool holder; and preferably incorporating means for uniformly controlling the operating temperature of these bearings.

In combination with these improvements in a tool holder, the invention contemplates the use of a rotary or drum type work holder assembly, which includes a demountable chuck having provision for mounting a plurality of work clamps which are successively brought into the path of travel of the tools by rotary movement of the chuck. The work holder assembly employed embodies improvements in construction and mounting, particularly of the chuck and work clamps, for the purpose of increasing the capacity of these parts to withstand tool reaction forces, decreasing the down time of the machine in changing the set up for a different work piece or replacement of parts, decreasing the effect of normal wear upon the operating accuracy of the machine, and simplifying the overhauling of the machine to correct for wear. The general arrangement of the machine is such that a plurality of work holder assemblies can be employed in combination with a single tool holder and here the invention involves the use of a simplified driving arrangement between tool and workholders to give synchronized operation thereof together with control of rates of feed and of the relative direction of rotation of the tool to the work piece carried by any single work holder assembly.

This combination of features offers in particular one solution to the problem of fully exploiting the working capacity of the improved materials currently available for both abrasive and cutting tools. High tool speeds can be attained, high tool reaction forces can be absorbed without loss of accuracy and practically continuous operation of the tools is secured. Together these results mean a potential rate of production far beyond that attainable with machines of existing design.

The embodiment of the invention illustrated and to be described in detail herein consists of a milling machine which, in the following specification, will be described generally followed by a specific description of the tool holder and a specific description of the work holder assembly employed.

In the accompanying drawings, the machine in general is shown in Figs. 1 and 2, the tool holder in Figs. 3 and 8, and the work holder assembly and parts thereof in Figs. 4 to 7.

A detailed description of these various views is as follows:

Fig. 1 is a side elevation of the machine;

Fig. 2 is an end elevation of the machine shown in Fig. 1;

Fig. 3 is a section taken along the line 3—3 of Fig. 2, showing the tool holder and associated parts;

Fig. 4 is a section taken along the line 5—5 of Fig. 2 to show the construction of the work holder assembly, its housing and driving mechanism;

Fig. 5 is an elevation of a portion of a polygonal faced chuck of a work holder assembly showing two adjacent faces thereof—one face with a work clamp attached thereto and the adjacent face plain or without a work clamp;

Fig. 6 is a plan view of the plain face of the chuck of Fig. 5 to show the keys provided for locating a work clamp;

Fig. 7 is an elevation schematically illustrating the outline of a few representative forms of polygonal faced chucks; and Fig. 8 is a fragmentary elevation of a tool holder to show a representative construction for securing tool thereto.

*Machine in general*

Referring to Figs. 1 and 2, the driving motor 10 and main driving shaft or spindle 11 of the machine are located within an outer cover 12, the spindle 11 being mounted in three bearings 13a, 13b and 13c. This spindle 11 is connected to an assembly comprising a fly wheel 15 and a circular tool holder 16, the tool holder being supported in a main vertical bed plate or housing member 14 at the working end of the machine by bearings as shown in detail in Fig. 3. A stub shaft 11a extends outwardly from the center of the tool holder 16 into a central gear box 17, from where the drive is carried to the work holders by means which will be presently described. Two work holder assemblies, each including a rotary chuck 18, are used in the form of machine illustrated. They are shown in their general relationship to the rest of the machine in Figs. 1 and 2 and in greater detail in Fig. 4.

The drive to the spindle 11 is by V-belts from an output pulley 120 on the motor 10, through pulleys 121 and 122 on a countershaft 112, to the large pulley 44 on the main shaft 11. Countershaft 112 is mounted in bearings 111a and 111b. In addition to the vertical housing 14, the construction of the machine frame includes a horizontal base member 110 which supports the motor 10, bearings 111a and 111b for the countershaft 112, and bracket member 118 for the rear bearing 13a of the spindle 11. A box type of construction is used to brace the main vertical housing 14, and consists of a pedestal formed of a vertical plate 113 and a horizontal plate 114 supporting another vertical plate 115, these three plates being cut away to accommodate the motor 10 and other drive units. Plate 115 is provided with a central aperture 116 to receive the bearing 13b, and is interconnected with the housing 14 by a number of spaced bracing bars 117. The bearing bracket 118 is braced to this structure by a horizontal plate 119 upon which the bearings 13a and 13b rest.

At the working end of the machine, the frame consists of another pedestal comprising the vertical members 123 and 124, horizontal plate 125 and end plates 128, and two pair of horizontal bars 126 which project outwardly from the main housing 14, each bar extending through the housing 14 and being carried by the housing and a bracket member 127 mounted thereon.

Each chuck 18 is carried by a housing 19 mounted upon a base plate 20 which in turn is supported in V- ways 21 of a carriage 22. The carriage 22 is mounted upon a pair of transverse bars 23, these bars extending between a pair of plates 24 mounted on the front pedestal of the frame, which form part of the main frame of the machine. This method of mounting provides for both longitudinal and lateral movement of each housing 19 and work chuck 18, longitudinal movement taking place along the V-ways 21 in response to movement of a hand wheel 25 carried by a shaft 26 which is provided with a threaded portion to engage a nut 27 depending from the base plate 20. Lateral movement takes place along the bars 23 in response to rotation of a hand wheel 28 carried by a shaft 29 extending between the pair of parallel bars 23 and likewise engaging a nut (not shown) depending from the supporting carriage 22.

An upper adjustable connection is provided between each housing 19 and the frame of the machine to further stabilize the housing yet allow the longitudinal and lateral change in the position thereof, this connection comprising a pair of slotted links 130 connected at spaced points to bosses on the outer face of each housing by bolts 131 and 132, with each pair of links being secured at a common point 133 to a carriage 134. One carriage 134 is slidably mounted on each of the pair of horizontal bars 126 and can be held in fixed position along the bars by clamp screws 135.

The drive to each work holder housing is identical. The stub driving shaft 11a carries a worm 30 located within the central gear box 17 and engaging a worm gear 31 mounted upon a transversely extending shaft 32. Shaft 32 extends outwardly from each side of the gear box 17 and each extending portion of this shaft is splined to engage one end 34 of a universal joint 35, the other end of which is similarly splined to engage the end of a shaft 36 extending from the work holder housing 19. The universal joint 35 and its splined connection to shafts 32 and 36 permit limited longitudinal and lateral movement of each work holder housing sufficient to allow for all normal adjustments.

Reference should now be made to Fig. 4 which shows the construction of each work holder housing and the driving means employed to translate rotary movement of the shaft 36 to rotary movement of each chuck 18. Shaft 36 carries a worm 37 which engages a worm gear 38 keyed to a shaft 39. One of a pair of driving gears 40 and 41 is removably mounted upon the outer end of shaft 39, the other gear being similarly mounted upon the corresponding end of the work holder drive shaft 42. Gears 40 and 41 are what may be termed the change speed gears of the machine, and while a one-to-one ratio between these gears is illustrated in the drawings, other ratios may be employed, according to the feed speed requirement for the material of the work piece.

Since the details of the construction of the chuck 18 and its housing will be fully described later in this specification under the heading "Work holder assembly," it is sufficient for the present to state that the chuck 18 is mounted so as to be driven by rotation of its drive shaft 42; and, as shown in Fig. 2, each chuck 18 carries a number of special purpose clamps or work engaging fixtures 43, which, through rotation of the chuck, are successively advanced into the path of travel of the tools carried by the tool holder 16. As can be seen from Fig. 2, the working diameter of the path of travel of work pieces (not shown) carried by the fixtures 43 is approximately of the same order as the working diameter of the tools carried by the tool holder 16.

The relative rate of rotation between chuck 18 and tool holder 16 establishes the feed, or rate of advance of the work piece towards the path of travel of the tool, which can be varied, for a given rate of rotation of the tool holder, by changing the ratio of the gears 40 and 41. The direction of rotation of the tools relative to the work piece is also controllable by the use or non-use of the optional system of change speed gearing illustrated on the left hand work holder of Fig. 2. Here, driving gears 40a and 41a, of smaller diameter than the corresponding gears 40 and 41, are employed in combination with an intermediate idler or reverse gear 45, to change the direction of rotation of this workholder drive shaft 42 from that established by the normal gear train previously described. Thus, in Fig. 2, if it is assumed that a clockwise rotation is imparted to the tool holder 16 by the driving motor 10, and that the drive from the stub shaft 11a to the work holder drive shafts 42 is such that a counterclockwise direction of rotation is normally imparted to each chuck 18, the optional use of the gears 40a, 41a and 45 will result in the left hand chuck being turned in a clockwise direction. This means that the machine may be operated for either a climb or conventional milling operation upon the work pieces carried by any chuck independently of the type of milling being performed upon the work pieces of any other chuck.

In order that the proper speed may be obtained for the type of tool being used and composition of the work upon which such tool is acting, the driving motor 10 may be of a variable speed type or, if preferred, a variable speed coupling may be used between the driving motor and spindle 11 in place of the pulleys, countershaft and V-belts shown in Fig. 1.

The general arrangement of the machine is designed to permit high tool speeds with relatively low rates of rotation of the component parts of the machine, these high tool velocities being obtained by the large diameter of the tool holder made possible by the overall design of the machine. This large diameter tool holder also makes it possible to employ the large drum or rotary type of chucks used so that new work is continuously presented to the cutting tools, and second, so that these cutting tools may be acting upon a plurality of work pieces simultaneously. A further advantage accruing from the use of the large diameter tool holder is that it permits the fly wheel 15 to be mounted directly to the tool holder structure where its momentum will be instantly available to aid in sustaining a uniform speed of the tools, without inducing any stresses in driving members as is the case where an energy storing device is mounted at some point in the driving train remote from the place where load changes occur. Details of the fly wheel and its mounting are given under the section "Tool Holder" of this specification.

While only two work holder assemblies are employed in the design of machine illustrated, it is to be recognized that it will be readily possible to furnish additional assemblies, depending upon the space available in the path of the cutting tools, this, of course, being determined by the actual dimension selected for the diameter of the tool holder. However, the actual number of chucks and work carriers simultaneously usable will also depend upon the size of the work piece and its positioning upon the chuck.

It may, in some cases, also be desirable to design the machine so that the tool holder and chucks are mounted upon vertical axes rather than horizontal axes as shown, in order either to provide for additional work holder assemblies or to facilitate the handling of the particular type of article to be carried by the chuck of such assemblies. In this connection, it should at all times be borne in mind that a machine of this type is regarded primarliy as a special purpose machine and will usually be designed and constructed to operate on some particular high production article.

Tool holder

As previously mentioned, the tool holder is mounted for rotation in bearings carried by the main housing member 14 of the machine. Details of this construction are shown in Fig. 3. Preferably the tool holder is constructed in two pieces—an outer disc 50 which carries the cutting tools 51 and an inner disc 52 which is connected to the fly wheel 15. These two discs are connected by bolts 53 and the outer disc 50 carries the stub driving shaft 11a while the inner disc 52 is secured to a flange 54 formed at the end of the spindle 11. Inner disc 52 is formed with a threaded portion 55, adapted to be engaged by an adjusting nut 56 and a locking nut 57, and a tapered cylindrical portion 58, the tapered portion thereof engaging a similarly tapered bushing 59, which constitutes one of the main radial bearings of the tool holder assembly. A thrust bearing 60 is located between the inner surface of the housing member 14 and the adjusting nut 56.

The outer disc 50 is formed with a shoulder 61 and a tapered surface 62, the shoulder forming a recess into which a second thrust bearing 63 is fitted, and the tapered surface 62 engaging a similarly tapered bushing 64 which constitutes the second main radial bearing of the assembly. Inner and outer dust seals 69 and 70, respectively, are employed for the protection of this system of bearings. A circular recess 65 is formed in the housing 14 so that a fluid carrying conduit 66 may be mounted adjacent the bushing 59 and a second recess 67 is formed in the housing so that similar fluid carrying conduit 68 may be positioned adjacent the bushing 64. Means for circulating fluid through these conduits is not shown as satisfactory devices of this type are well known and commercially available, along with devices and systems for controlling the temperature of the fluid. Primarily, the purpose of the conduits and function of the fluid circulated therethrough is to insure that the temperature of the bearings will be maintained at substantially equal values around the bearing surface so that warpage or distortion due to unequal temperature distribution will not occur.

The outer disc 50 mounts a tool positioning ring 71 which is preferably provided with a tapered outer surface 72 to engage the butt end of the tools when the same are placed at their proper cutting angle. This ring correctly positions the tools radially of the holder and serves as a reference point so that all tools may be ground to the same length. No specific means for clamping the cutting tools to the outer disc is shown in Fig. 3. There are several devices commercially available for this purpose and the selection of the proper means will depend to some extent upon the type of tool being employed, but for purposes of illustration, a representative clamping device is illustrated in Fig. 8. In this form, the outer disc 50 is shaped with a series of teeth or serrations 75, each having a positioning face 76 and a wedging face 77. A tool 78 is firmly held between the face 76 and the face 79 of a tool clamp 80, the clamp having a wedging face similar to face 77 and being urged into engagement therewith by a clamp screw 81.

The outer disc is preferably made as a separate member so that it can be removed from the machine for making tool changes or so that alternative types of outer discs may be employed for various tool set-ups, depending upon the work to be done. Since the connection between the stub shaft 11a and the worm 30 carried thereby is a splined one, the outer disc can be readily removed by simply removing the bolts 53 which connect it to the inner disc and the bolts 73 which connect it to the stub shaft 11a, and sliding the disc 50 and stub shaft outwardly from the face plate 14 of the machine.

Several types of tool set-up may be employed in a machine of this kind in addition to the single ring of cutting tools shown. For example, this ring of tool blades may be composed of alternate roughing and finishing tools with the finishing tool set inwardly and above—to the extent of the depth of the finishing cut—the roughing tool; or, the composition of the ring could consist of a milling cutter in combination with a honing tool for finishing the surface of the work. Another type would be where a second ring of tools are employed to mill a surface at a different level from that acted upon by the outer ring of tools. A fourth illustration would be where abrasive tools are mounted upon the tool holder, in lieu of the cutting tools shown, to perform a grinding rather than a milling operation.

The design and mounting of this tool holder makes it possible to have tools operating on a large working diameter so that high speeds can be obtained with relatively low velocities of the rotating parts of the machine and without loss of accuracy of the machine. With conventional methods of mounting tools, large working diameters of the tools cannot be obtained without sacrificing the accuracy of the machine and without employing excessively large shafts, due to the fact that in conventional practice, the tool holder is supported by the bearings which engage its driving shaft and the tools are located outwardly of the bearings with a cantilever type of support. Therefore, a large component of the tool reaction force is radial, distorting the tool holder and aggravating bearing wear. With the present construction, the supporting bearings for the tool holder are located approximately at, or outwardly of the area where the reaction between the tool and work piece occurs and the entire tool holder is fixed against radial and axial movement. The support of the tools is of the simple beam type rather than cantilever, and greater bearing area can be provided for the transmission of reaction forces to the stationary structure of the machine. These differences from conventional practice in mounting the tool holder make it possible to achieve high tool velocities with complete cutting accuracy and with prolonged tool life because of the fact that the tool holder is precisely held against movement due to tool reaction.

*Work holder assembly*

Each chuck 18 is attached to a driving spindle 85 by a key 86 and a series of bolts 87, the spindle being formed with a cylindrical pilot surface 88 and a pair of tapered surfaces 89. Similar cylindrical and tapered surfaces 88a and 89a are internally formed in the chuck 18. The spindle 85 is secured to the main drive shaft 42 by bolts 90 extending through a flange 91 formed at the outer end of the latter and the spindle rotates upon a bearing carrier member 92 which is secured to the vertical bearing plate 102 of the housing by bolts 93. This bearing carrier 92, in addition to providing a journal 94 for the shaft 42, also provides a spindle thrust bearing 95 and an inner radial bearing 96 which is engaged by an inner cylindrical surface 97 of the spindle. The spindle is also formed with an outer cylindrical surface 98 which engages an outer radial bearing 99 carried within a cylindrical recess 100 of the housing proper. A thrust bearing 101 is positioned between the outer surface of the housing plate 102 and the surface 103 of the spindle, and a second thrust bearing 104 is positioned adjacent the inner face of the housing plate 102, and held in position by a spacer 105 and adjusting and locking nuts 106 and 107. These nuts engage a threaded portion 108 formed on the drive shaft 42 and serve to retain the shaft 42 and spindle 85 upon the housing.

In addition to the vertical bearing plate 102 and base plate 20 having transverse attaching ribs 109 and 140, the construction of the housing includes an intermediate vertical plate 141 which carries bearings 142 and 143 for the shafts 39 and 42 respectively. This intermediate plate 141 is removably secured to the transverse rib 140 of the base plate and to an outer wall section 144 attached to the plate 102. A second outer wall section 145 is carried by the vertical plate 141 and the construction of the housing is completed by an end plate 146 attached to the section 145 and to the rib 109 by bolts 147.

The relationship of these various parts which comprise the work holder and housing assembly may perhaps be better understood from a brief discussion of the manner in which these parts are preferably assembled. Assuming that all parts are in disassambled relationship, including the removal of the end plate 146 and intermediate plate 141 from the housing assembly, the drive shaft 42 is inserted within the core of the spindle 85 and the flange 91 of the shaft secured to the spindle by the bolts 90. After the bearing carrier 92 has been secured to the vertical plate 102 of the housing by the bolts 93 and the thrust bearing 101 has been placed in position, the shaft 42 and spindle 85 can be inserted within the journal 94 from the right in Fig. 4 and the thrust bearing 104 and spacer 105 can be slipped over the inner end of the shaft. The adjusting and retaining nut 106 is screwed upon the threaded portion 108 of the shaft 42 to secure the shaft and spindle in a position for proper rotary motion upon the housing and bearing carrier. This position is maintained by locking nut 107. It is believed that the method of assembling the remaining parts, comprising the driving train to the shaft 42, and the housnig members 141 and 146 is self-evident.

The system of bearings employed for mounting the shaft and spindle insures that the reaction between the work piece and tools will be absorbed by the housing 19 with a minimum amount of distortion of the parts, thus maintaining maximum accuracy. No temperature control of these bearings has been provided due to the low rotational speed at which these parts operate.

The work piece clamps 43, which are of any design for satisfactory holding of the particular work piece 138 being machined, are secured to the outer faces 46 of the chuck 18 by screws 82 received in threaded holes 83 therein.

The construction and mounting of the chuck 18 allows considerable latitude in its design for the accommodation of the particular type, size and number of work pieces to be machined, and also provides for ready removal of the chuck 18 from the machine should this become desirable for any reason, such as to change over to a dilfferent chuck and work clamp set-up. Such a change may involve the use of a different design of clamp to hold another work piece, and/or a different style of chuck such as one of the other types of polygonal faced chucks 18a, 18b or 18c, schematically shown for illustrative purposes in Fig. 7. Each chuck is preferably constructed so that any work clamp designed within the dimensional limits established by the overall specifications of the machine and style of chuck selected, may be constructed so that it can be precisely located upon and attached to the chuck and the new chuck and clamp set-up assembled away from the machine. Each face 46 of a chuck is formed with two intersecting keyways 47 and 48. In the illustration given in Figs. 5 and 6 of the drawings, these keyways are located at a 90° angle of intersection, with a key 49 being located in the keyway 48 and two keys 74 in the keyway 47, all keys being secured by screws 139. These keys thus establish a fixed location of the work clamp 43 when similar keyways 84 are formed in its mating surface.

The actual operation of changing the chuck on the machine is facilitated by cylindrical pilot surfaces 88 and 88a provided on the spindle 85 and chuck respectively since the engagement of these surfaces will cause the weight of the chuck to be supported by the machine structure while the chuck is being properly positioned for insertion of the attaching bolts 87.

When the machine is in operation, each chuck is continuously rotated, as distinguished from an indexing type of movement commonly employed in present practice with chucks for holding a series of articles, either work pieces or tools. Therefore, wear on the bearings of the work holder assembly is evenly distributed and no problem exists in operating the machine in such a way as to avoid the localized wear that can occur in the guides of reciprocating tables. Furthermore, in the present machine, after wear has occurred in any of the major operating parts to a sufficient extent that the machining operation cannot be held within the limits of accuracy desired, it is possible to return the machine to its original degree of accuracy by the relatively simple overhaul procedure of installing and working in new bearing surfaces where required.

Due to the fact that, as previously mentioned, the machine of the invention is primarily intended for use as a high production special purpose unit, its overall design and specific arrangement of component parts, particularly the tool and work holder assemblies may vary considerably in actual practice. The specific embodiment of the invention described herein is, therefore, intended only as representative of the construction of a machine incorporating the features described.

This application is a division of 159,833 filed May 3, 1950, and now Patent No. 2,729,144.

I claim:

1. A machine tool having frame structure including a housing member having a wall, a circular aperture extending through said wall, a milling tool having a cylindrical body and circular series of cutter bits mounted on the outer end face thereof, said body being of substantially the same thickness as said wall and situated in said aperture and housed by said wall, bearing surfaces on said tool body intermediate the end faces thereof and complementary bearing surfaces on the said apertured portion of said wall for mounting said tool body in said aperture, the radial distance of said cutter bits from the center of rotation of said tool body being substantially equal to the radial distance of said bearing surfaces from said center of rotation, and driving means carried by said frame structure for rotating said tool body in said wall.

2. A machine tool construction according to claim 1 wherein said bearing surfaces include oppositely facing radially extending surfaces on said wall and said tool body.

3. A machine tool construction according to claim 1 wherein said bearing surfaces rotatably support said tool body in said aperture independently of said driving means.

References Cited in the file of this patent

UNITED STATES PATENTS

| | | |
|---|---|---|
| 394,056 | Cameron | Dec. 4, 1888 |
| 462,050 | Kelly | Oct. 27, 1891 |
| 1,104,044 | Goetz | July 21, 1914 |
| 1,768,685 | Hallam | July 1, 1930 |
| 2,736,243 | Armitage et al. | Feb. 28, 1956 |

FOREIGN PATENTS

| | | |
|---|---|---|
| 504,156 | France | Apr. 3, 1920 |